US010289648B2

(12) United States Patent
Arora et al.

(10) Patent No.: US 10,289,648 B2
(45) Date of Patent: *May 14, 2019

(54) ENFORCING CATEGORY DIVERSITY

(71) Applicant: Google LLC, Mountain View, CA (US)

(72) Inventors: Neha Arora, San Carlos, CA (US); Ke Yang, Cupertino, CA (US); Zuguang Yang, Milpitas, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/350,377

(22) Filed: Nov. 14, 2016

(65) Prior Publication Data

US 2017/0061025 A1 Mar. 2, 2017

Related U.S. Application Data

(63) Continuation of application No. 13/252,258, filed on Oct. 4, 2011, now Pat. No. 9,507,801.

(51) Int. Cl.
*G06F 17/30* (2006.01)
*G06F 16/9535* (2019.01)
(Continued)

(52) U.S. Cl.
CPC ........ *G06F 16/9535* (2019.01); *G06F 16/245* (2019.01); *G06F 16/248* (2019.01);
(Continued)

(58) Field of Classification Search
CPC .......... G06F 17/30424; G06F 17/3053; G06F 17/30864; G06F 17/30867; G06F 16/245;
(Continued)

(56) References Cited

U.S. PATENT DOCUMENTS 6,453,315 B1 * 9/2002 Weissman ........... G06F 16/3338
6,532,301 B1 * 3/2003 Krumm .................... G06K 9/46
382/165

(Continued)

*Primary Examiner* — Mark E Hershley
(74) *Attorney, Agent, or Firm* — Fish & Richardson P.C.

(57) ABSTRACT

Methods, systems, and apparatus, including computer programs encoded on a computer storage medium, for enforcing the category diversity or sub-category diversity of POIs that are identified in response to a local search. According to one implementation, a method includes receiving a request to identify points of interest (POIs), obtaining data identifying (i) candidate points of interest (POIs) that satisfy the request, (ii) a respective category associated with each candidate POI, and (iii) a non-scaled score associated with each candidate POI, and ranking, for each of one or more of the categories, the candidate POIs associated with the category, based on the respective non-scaled scores. The method also includes scaling, for each of the one or more categories, the non-scaled scores of the ranked candidate POIs associated with the category, ranking the candidate POIs using the scaled scores, for the candidate POIs that are associated with the one or more categories, and the non-scaled scores, for the candidate POIs that are not associated with the one or more categories, and providing data that identifies two or more of the candidate POIs, as ranked according to the scaled scores and the non-scaled scores.

17 Claims, 3 Drawing Sheets

(51) Int. Cl.
  *G06F 16/29* (2019.01)
  *G06F 16/245* (2019.01)
  *G06F 16/248* (2019.01)
  *G06F 16/951* (2019.01)
  *G06F 16/2457* (2019.01)

(52) U.S. Cl.
  CPC ........ *G06F 16/24578* (2019.01); *G06F 16/29* (2019.01); *G06F 16/951* (2019.01)

(58) Field of Classification Search
  CPC ............. G06F 16/24578; G06F 16/951; G06F 16/953; G06F 16/9535; G06F 16/9536
  USPC ......................................................... 707/723
  See application file for complete search history.

(56) References Cited

U.S. PATENT DOCUMENTS

| | | | | |
|---|---|---|---|---|
| 7,284,008 B2* | 10/2007 | Henkin | G06Q 30/0255 | |
| 7,565,630 B1* | 7/2009 | Kamvar | A61K 48/00 | |
| 7,725,465 B2* | 5/2010 | Liao | G06F 21/6227 | 707/728 |
| 7,949,643 B2* | 5/2011 | Kawale | G06F 17/30867 | 707/706 |
| 8,065,301 B2* | 11/2011 | Ginsburg | G06F 16/951 | 707/736 |
| 8,290,927 B2* | 10/2012 | Kawale | G06F 17/30867 | 707/708 |
| 8,407,211 B1* | 3/2013 | Lewis | G06F 16/29 | 707/722 |
| 8,429,184 B2* | 4/2013 | Ismalon | G06F 16/9535 | 707/765 |
| 8,433,512 B1* | 4/2013 | Lopatenko | G01C 21/3679 | 701/400 |
| 8,442,972 B2* | 5/2013 | Ismalon | G06F 16/24578 | 707/721 |
| 8,463,772 B1* | 6/2013 | Aminzade | G06F 16/9537 | 707/723 |
| 8,577,915 B2* | 11/2013 | Barve | G06F 16/951 | 707/769 |
| 8,600,993 B1* | 12/2013 | Gupta | G06F 16/955 | 707/737 |
| 8,738,612 B1* | 5/2014 | Tourn | G06F 16/248 | 707/723 |
| 8,903,810 B2* | 12/2014 | Ismalon | G06F 16/3322 | 707/723 |
| 2002/0022956 A1* | 2/2002 | Ukrainczyk | G06F 17/218 | 704/9 |
| 2002/0111847 A1* | 8/2002 | Smith, II | G06Q 30/02 | 705/7.31 |
| 2005/0144052 A1* | 6/2005 | Harding | G06Q 10/087 | 705/26.1 |
| 2006/0004891 A1* | 1/2006 | Hurst-Hiller | G06F 16/3325 | |
| 2006/0287810 A1* | 12/2006 | Sadri | G01C 21/20 | 701/438 |
| 2008/0010281 A1* | 1/2008 | Berkhin | G06F 16/951 | |
| 2008/0140641 A1* | 6/2008 | Wang | G06F 16/951 | |
| 2008/0155426 A1* | 6/2008 | Robertson | G06F 16/338 | 715/738 |
| 2008/0172374 A1* | 7/2008 | Wolosin | G06F 16/9537 | |
| 2009/0024605 A1* | 1/2009 | Yang | G06F 16/9535 | |
| 2009/0037342 A1* | 2/2009 | Kennedy | G06Q 40/06 | 705/36 R |
| 2009/0164929 A1* | 6/2009 | Chen | G06F 16/9535 | 715/769 |
| 2009/0177652 A1* | 7/2009 | Markham | G06F 16/951 | |
| 2009/0271391 A1* | 10/2009 | Kawale | G06F 16/9535 | |
| 2010/0049684 A1* | 2/2010 | Adriaansen | G06F 17/27 | 706/46 |
| 2010/0100543 A1* | 4/2010 | Brady | G06F 16/31 | 707/732 |
| 2010/0121712 A1* | 5/2010 | Shahshahani | G06Q 10/0637 | 705/14.54 |
| 2010/0121842 A1* | 5/2010 | Klinkott | G06F 16/9577 | 707/722 |
| 2010/0195914 A1* | 8/2010 | Isard | G06K 9/4676 | 382/201 |
| 2010/0235343 A1* | 9/2010 | Cao | G06F 16/951 | 707/710 |
| 2010/0257234 A1* | 10/2010 | Caughey | H04L 67/306 | 709/203 |
| 2010/0268651 A1* | 10/2010 | Raskina | G06Q 10/04 | 705/80 |
| 2010/0331016 A1* | 12/2010 | Dutton | H04W 4/02 | 455/456.3 |
| 2011/0055185 A1* | 3/2011 | Bitan | G06F 16/951 | 707/706 |
| 2011/0093331 A1* | 4/2011 | Metzler | G06Q 30/02 | 705/14.49 |
| 2011/0137895 A1* | 6/2011 | Petrou | H04W 4/02 | 707/723 |
| 2011/0145228 A1* | 6/2011 | Laurenzo | G01C 21/32 | 707/723 |
| 2011/0173194 A1* | 7/2011 | Sloo | G06F 16/9535 | 707/736 |
| 2011/0196860 A1* | 8/2011 | Kawale | G06F 17/30867 | 707/723 |
| 2011/0238670 A1* | 9/2011 | Mercuri | G06F 16/9535 | 707/748 |
| 2011/0258556 A1* | 10/2011 | Kiciman | G06Q 10/10 | 715/751 |
| 2011/0289090 A1* | 11/2011 | Zhou | G06Q 30/02 | 707/740 |
| 2012/0016873 A1* | 1/2012 | Mathieson | G06F 16/24578 | 707/727 |
| 2012/0095819 A1* | 4/2012 | Li | G06Q 30/02 | 705/14.23 |
| 2012/0158685 A1* | 6/2012 | White | G06F 16/9535 | 707/706 |
| 2012/0209831 A1* | 8/2012 | Rehman | G06F 16/24578 | 707/723 |
| 2012/0209861 A1* | 8/2012 | Narasimha | G06F 16/29 | 707/750 |
| 2012/0221557 A1* | 8/2012 | Edmonds | G06Q 30/0282 | 707/723 |
| 2012/0301014 A1* | 11/2012 | Xiao | G06F 16/583 | 382/159 |
| 2013/0073988 A1* | 3/2013 | Groten | G06Q 30/02 | 715/753 |
| 2015/0161176 A1* | 6/2015 | Majkowska | G06F 16/532 | 707/722 |

* cited by examiner

ENFORCING CATEGORY DIVERSITY

CROSS-REFERENCE TO RELATED APPLICATION

This is a continuation of U.S. application Ser. No. 13/252,258, filed Oct. 4, 2011, the contents of which are incorporated by reference.

BACKGROUND

This specification generally relates to search engines, and one particular implementation relates to an enhancement for a local search engine.

When informed with a user's location, a local search engine may identify points of interest (POIs), such as business, parks or museums, that are located near the user.

SUMMARY

In general, one innovative aspect of the subject matter described in this specification can be embodied in methods that enforce the category diversity or sub-category diversity of POIs that are identified in response to a local search. For example, listings associated with over-represented categories or sub-categories can be demoted, and listings associated with under-represented categories or sub-categories can be promoted.

According to another innovative aspect of the subject matter described in this specification, a method includes receiving a request to identify points of interest (POIs), obtaining data identifying (i) candidate points of interest (POIs) that satisfy the request, (ii) a respective category associated with each candidate POI, and (iii) a non-scaled score associated with each candidate POI, ranking, for each of one or more of the categories, the candidate POIs associated with the category, based on the respective non-scaled scores, scaling, for each of the one or more categories, the non-scaled scores of the ranked candidate POIs associated with the category, ranking the candidate POIs using the scaled scores, for the candidate POIs that are associated with the one or more categories, and the non-scaled scores, for the candidate POIs that are not associated with the one or more categories, and providing data that identifies two or more of the candidate POIs, as ranked according to the scaled scores and the non-scaled scores.

Other embodiments of this aspect include corresponding systems, apparatus, and computer programs, configured to perform the actions of the methods, encoded on computer storage devices.

These and other embodiments can each optionally include one or more of the following features. For instance, the method includes selecting, as the one or more categories, one or more categories that are each associated with more than a predetermined number of candidate POIs; the predetermined number is two; the method includes selecting, as the one or more categories, one or more categories that are each associated with one or more candidate POI; scaling, for each of the one or more categories that are associated with only one candidate POI, the non-scaled score of the ranked candidate POI associated with the category comprises multiplying the non-scaled score of the ranked candidate POI associated with the category by a factor of one; scaling the non-scaled scores of the ranked, candidate POIs includes increasing the respective non-scaled scores of the top n ranked candidate POIs; scaling the non-scaled scores of the ranked, candidate POIs includes leaving unchanged the non-scaled scores of one or more of the top n ranked candidate POIs; scaling the non-scaled scores of the ranked, candidate POIs includes decreasing the non-scaled scores of one or more of the top n ranked candidate POIs; the method includes dynamically determining a scaling factor to use to scale one or more non-scaled scores of the ranked, candidate POIs of a particular category based on a non-scaled score associated with a top ranked candidate POI of a different category; and/or the method includes dynamically determining a scaling factor to use to scale one or more non-scaled scores of the ranked, candidate POIs of a particular category based on a quantity of the candidate POIs of the particular category identified in the data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
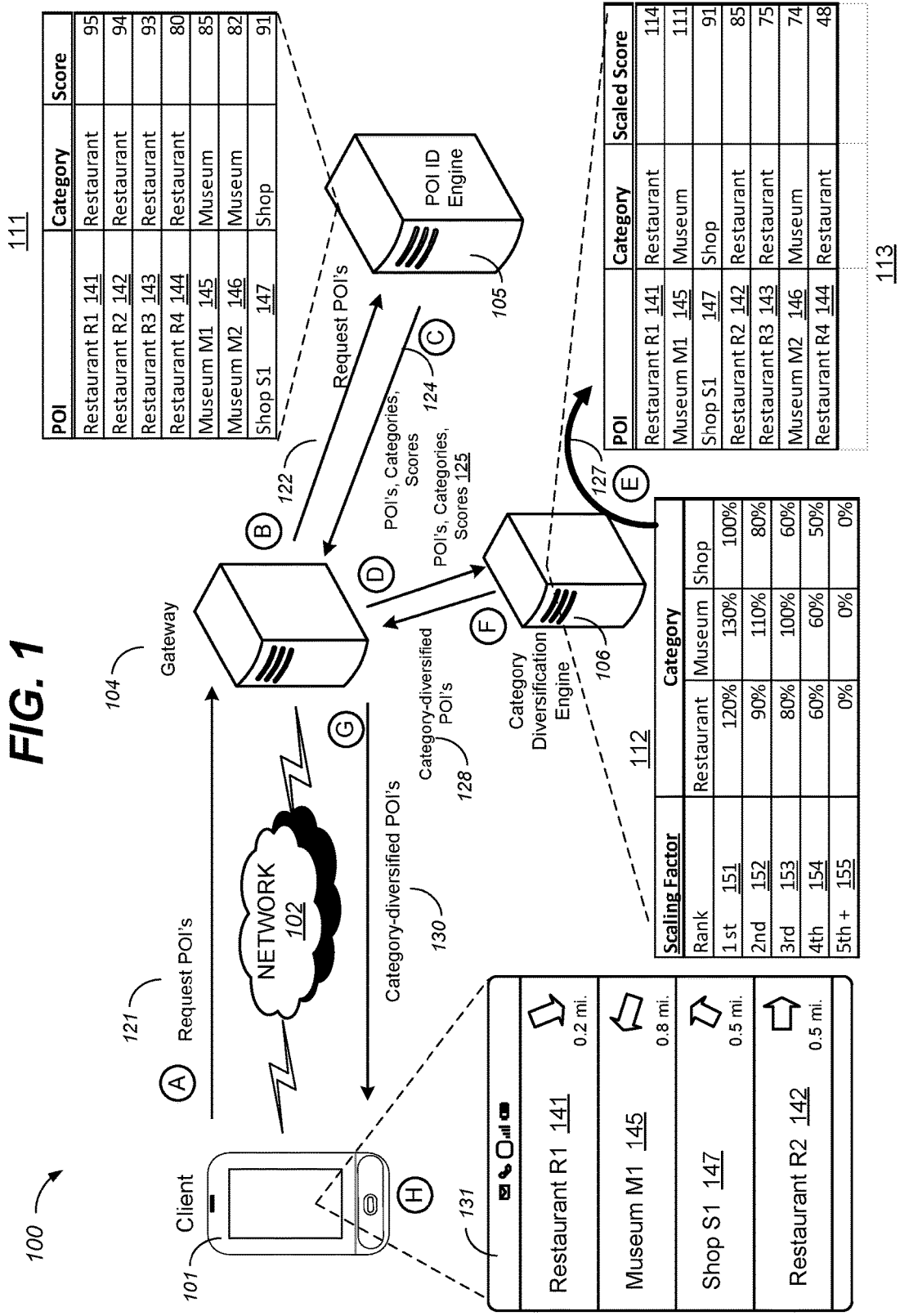
FIG. 1 is a block diagram of an example system that diversifies POIs using category scaling, at the server-side.

FIG. 1 is a block diagram of an example system 100 that diversifies POIs using category scaling, at the server-side. As used by this specification, a "category" refers to a class of POIs that share a particular characteristic or particular characteristics. Example POI categories include "shop," "restaurant," "museum," "park," or "government building." A "sub-category" refers to a class of POIs that shares a particular characteristic or particular characteristics with other POIs in the same category, but that does not share a particular characteristic or particular characteristics with other POIs of another class in the same category. Example POI sub-categories include "Restaurant: Indian" and "Restaurant: Mexican" for the category "Restaurant," and "Government Building: Airport" and "Government Building: Post Office" for the category "Government Building."

Briefly, when a user requests to receive POI information relating to a particular location, the system 100 generates a collection of candidate POIs and receives information relating to each candidate POI's respective category and the score and rank within the respective category, and, for categories selected for scaling, promotes or demotes the score of each ranked candidate POI within its respective category through a scaling process. The system 100 then re-ranks the scaled candidate POIs from the selected categories and the non-scaled candidate POIs from the other categories into one category-diversified POI collection over all categories, and returns the category-diversified POI collection to the client. In general, the system 100 includes a client device 101, a network 102, a gateway 104, a POI identification (ID) engine 105, and a category diversification engine 106.

As used in this specification, an "engine" (or "software engine") refers to a software implemented input/output system that provides an output that is different from the input. An engine can be an encoded block of functionality, such as a library, a platform, a Software Development Kit ("SDK"), or an object. The network 102 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any other delivery or tunneling mechanism for carrying data services. Networks may include multiple networks or subnetworks, each of which may include, for example, a wired or wireless data pathway.

The client device 101 may be a mobile phone, a laptop computer, a PDA (Personal Digital Assistant), a smart phone, a music player, a tablet computer, an e-book reader, or another portable or mobile device operated by a user. The client device 101 includes an input device to send requests for POIs through the network 102, and a display 131 for showing category-diversified POIs to the user. In another implementation, the client device 101 is not portable or mobile, but rather is a desktop computer or a server.

In general, the gateway 104 coordinates the requests and responses among the client device 101, the POI ID engine 105, and the category diversification engine 106. For example, when a user operating the client device 101 requests to receive POI information relating to a particular location, the request can be routed to the gateway 104 through the network 102. The gateway 104 forwards the request to the POI ID engine 105. Then, upon receiving a response including a POI collection from the POI ID engine 105, the gateway 104 forwards data referencing the POI collection to the category diversification engine 106. Once the category diversification engine 106 re-ranks the POIs using a category diversity scaling process, the re-ranked collection is forwarded to the gateway 104 to return to the client device 101.

In more detail, the POI ID engine 105 receives a request from the gateway 104 as an input. In some implementations, the request can contain user-specific information, e.g. user location, user-defined preferences, and time of the request. The POI ID engine 105 maintains or has access to a database containing candidate POIs and information related to the candidate POIs. Based on the request from the gateway 104, the POI ID engine 105 analyzes the request and generates a POI collection 111 from the database.

The POI collection 111 is, for example, a list or other data structure that specifies name and location information of the candidate POIs, as well as the category and score associated with each candidate POI. The scores associated with the candidate POIs can be determined by various criteria. For example, the criteria can be the number of reviews from other users, the quality of the reviews (e.g. one to five stars), the distance between a candidate POI to the user, the time of the request, etc. Each criterion can have a different weight, and the weighted scores are combined to construct a POI score for each candidate POI in the POI collection 111. In some implementations, the weights of the scores can be determined by the user's preferences, which are included in the POI request.

In some implementations, the POI ID engine 105 can sort the candidate POIs in the POI collection 111 based on the categories and the POI scores within each respective category. The POI ID engine 105 can also determine the number of candidate POIs to be included in the POI collection 111 based on predetermined thresholds. In one implementation, the POI ID engine 105 can use a minimum POI score as a threshold. In another implementation, the POI ID engine 105 can use a maximum distance between a candidate POI and the user as a threshold. The output from the POI ID engine 105 can be the POI collection 111, which is forwarded to another engine, e.g. the gateway 104 or the category diversification engine 106.

In more detail, the category diversification engine 106 receives the POI collection 111 as an input. The collection 111 can come directly from the POI ID engine 105, or indirectly through the gateway 104. The category diversification engine 106 sorts the candidate POIs into their respective categories, and ranks the candidate POIs within each of selected categories based on the POI scores in the POI collection 111. In one implementation, if there is only one candidate POI in a category, the category diversification engine 106 would not select the category and would not scale the one candidate POI. In another implementation, if there is only one candidate POI in a category, the category diversification engine 106 would select the category and scale the one candidate POI. The category diversification engine 106 then promotes or demotes the POI scores in the POI collection 111 through scaling of the POI scores across all selected categories.

For each candidate POI in the selected categories, the category diversification engine 106 scales that particular POI score through a scaling factor in a POI rank scaling table 112. The POI rank scaling table 112 is, for example, a list or other data structure that specifies scaling factors across some or all selected categories. The scaling factors can be derived manually or automatically. For each selected category, the scaling factors vary with the POI ranks.

In some implementations, a candidate POI with a higher rank can be promoted, which means the POI score associated with the higher-ranked candidate POI will become higher after scaling. A candidate POI with a lower rank can be demoted, which means the POI score associated with the lower-ranked candidate POI will become lower after scaling. The magnitude, or strength, of the scaling can vary with ranks, meaning as ranks go lower, the corresponding candidate POIs can be demoted more significantly. The scaling factors for a given rank can vary across different categories to reflect the relative importance of ranks within each respective category. In some implementations, a candidate POI with a higher rank can be neither promoted nor demoted, which means the POI score associated with the higher-ranked candidate POI will remain the same after scaling. A candidate POI with a lower rank can be neither promoted nor demoted, which means the POI score associated with the lower-ranked candidate POI will remain the same after scaling. When a candidate POI is neither promoted nor demoted, a scaling of the candidate POI is not required, although scaling can occur by, for example, multiplying a score associated with a candidate POI by a factor of 1.

The candidate POIs with the scaled scores in the selected categories and the candidate POIs with the non-scaled scores in other non-selected categories are collected in a category-diversified POI collection 113. The category-diversified POI collection 113 is, for example, a list or other data structure that specifies scaled and non-scaled scores for all candidate POIs included in the POI collection 111. In the category-diversified POI collection 113, all candidate POIs are ranked by their scores and are not sorted by categories. The scaled scores can allow a top candidate in an unpopular category to appear higher in ranks in the category-diversified POI collection 113. The category-diversified POI collection 113 can provide the user with more top search results across different categories. In some implementations, the category information associated with each candidate POI can be stored in the category-diversified POI collection 113, so the user can still sort the candidate POIs by categories if required. The output from the category diversification engine 106 can be the category-diversified POI collection 113, and is forwarded to another engine, e.g. the gateway 104.

FIG. 1 also illustrates an example flow of data, shown in states (A) to (H). States (A) to (H) may occur in the illustrated sequence, or they may occur in a sequence that is different than in the illustrated sequence. During state (A), a user operating a client device 101 makes a request 121 to receive POI information relating to a particular location, and the request 121 is routed to a gateway 104 through a network 102. The specific location can be the current location of the client device 101, or can be a location of which the user is interested in exploring. In some implementations, the request 121 may include other user information, e.g. user preferences, time of request, etc.

During state (B), the gateway 104 determines that the request 121 is related to identifying POIs near a location, and sends a request 122 to a POI ID engine 105 to retrieve candidate POI information. The POI ID engine 105 receives the request 122, and constructs a POI collection 111 based on the request 122. In this present example, the POI collection 111 contains seven candidate POI entries 141 to 147, and the POI collection 111 includes information on candidate POI names, as well as the categories and scores associated with the candidate POIs 141 to 147. The scores can be determined by various criteria, which in one implementation can be weighted scores associated with factors such as the distances between the user and the candidate POIs, the number of reviews by other users provided to the candidate POIs, the quality of the candidate POI reviews, the time of the request, etc.

In this present example, among the seven candidate POIs 141 to 147 in the POI collection 111, four candidate POIs (141 to 144) belong to the category "Restaurant," two candidate POIs (145 and 146) belong to "Museum," and one candidate POI (147) belong to "Shop." Here, the candidate POIs 141 to 147 in the POI collection 111, ranked by the POI scores from the highest to the lowest, are [141 (Restaurant), 142 (Restaurant), 143 (Restaurant), 147 (Shop), 145 (Museum), 146 (Museum), 144 (Restaurant)]. The top three candidate POIs are all associated with the category "Restaurant," which may not be helpful information for a user who is not looking for a place to eat. The over-representation of the POIs in the category "Restaurant" may also limit the number of POI categories the user can view on the client device 101, as the display on a portable or mobile device may only be large enough to show a few POIs to the user at a time.

In general, one instance of over-representation can occur when candidate POIs in a category (i.e. "Restaurant") have higher POI scores than candidate POIs in other categories, due to the fact that more reviewers have reviewed POIs associated with the category (i.e. "Restaurant") than have reviewed POIs associated with other categories (i.e. "Museum"). Another instance where an over-representation of candidate POIs in a particular category may occur is in a user-specified location (i.e. a hospital building) where many candidate POIs in the same category are densely-clustered (i.e. doctors' offices inside the hospital complex); the user can easily overlook a candidate POI in a different category (i.e. a gift shop inside the same hospital complex) if it is not placed near the top of the rank.

During state (C), the POI collection 111 is forwarded in a message 124 from the POI ID engine 105 to the gateway 104. In one implementation, the POI collection 111 can be forwarded in its entirety to the gateway 104. In another implementation, the POI ID engine 105 can provide the gateway 104 with a location pointer of which the POI collection 111 is stored and can be retrieved.

During state (D), the gateway 104 sends the POI collection 111 in a message 125 to a category diversification engine 106. In one implementation, the POI collection 111 can be forwarded in its entirety to the category diversification engine 106. In another implementation, the gateway 104 can provide the category diversification engine 106 with a location pointer of which the POI collection 111 is stored and can be retrieved.

Upon receiving the POI collection 111, the category diversification engine 106 sorts the candidate POIs in the POI collection 111 into their respective categories. Then the category diversification engine 106 determines and selects which categories should be ranked and scaled. For example, for a singleton candidate POI, which is the only candidate POI present in a category, no ranking and scaling steps are required for the singleton candidate POI, since a category with one POI is not considered an over-represented category. For the selected, over-represented categories, the category diversification engine 106 ranks the candidate POIs within each selected category by their POI scores. The ranked POI scores are then promoted or demoted with a POI rank scaling table 112.

The POI rank scaling table 112 contains scaling factors associated with all ranks and categories in the POI collection 111. In general, a scaling factor is a numerical function which takes a POI score as the input, and transforms the POI score into a new score through a defined mechanism. In this present example, the scaling factor is a percentage multiplier, where a POI score is multiplied by a scaling factor associated with the candidate POIs category and the candidate POIs rank within that category.

The scaling factors can be pre-determined manually by an administrator of the category diversification engine 106, or automatically by a software module. Here, the scaling factors vary depending on the rank and the category of the candidate POIs. For example, a table entry 151 in the POI rank scaling table 112 indicates that for the top-ranked candidate POIs in each category, the POI scores associated with the categories "Restaurant" and "Museum" will be promoted by scaling factors "120%" and "130%", respectively; however, the POI score associated with the category "Shop" will be neither promoted or demoted, as the corresponding scaling factor here is "100%." Within each selected category, candidate POIs can be further demoted at lower ranks. The increasing demotions of lower-ranked candidate POIs within a category allow top-ranked candidate POIs in other categories to emerge in the displayed search results.

In some implementations, the scaling factors can be determined dynamically upon the category diversification engine 106 receiving the POI collection 111. In one example, the scaling factors can be determined based on the distribution of various categories among all candidate POIs in the POI collection 111. In the case of over-representation of candidate POIs in a category, the category diversification engine 106 may generate or adjust scaling factors to demote lower-ranked candidate POIs in the over-represented category more significantly than lower-ranked candidate POIs in other categories. In another example, the scaling factors of the candidate POIs in a particular category can be determined dynamically based on the non-scaled score of a top-ranked candidate POI in a different category. In the case where the non-scaled score of the top-ranked candidate POI in the different category is much higher than the non-scaled score of the top-ranked candidate POI in the particular category, the category diversification engine 106 may generate or adjust scaling factors for the particular category to significantly promote the top-candidate of the particular category, to guarantee or increase the chance that the top-candidate of the particular category will appear among the top search results of a local search.

In some implementations, for a singleton candidate POI where a scaling factor is "100%", no ranking and scaling steps are required for the singleton candidate POI. The non-scaled POI score for the singleton candidate POI in the POI collection 111 can be used to compare with the scaled POI scores. In this present example, the candidate POI 147 is a singleton candidate POI, and the non-scaled POI score for the candidate POI 147 can be used to compare with the scaled POI scores without going through ranking and scaling in the category diversification engine 106.

During state (E), the category diversification engine 106 applies the POI rank scaling table 112 to the selected categories, and then re-ranks the candidate POIs by the scaled scores in the selected categories and the non-scaled scores in the other categories via a process 127 into a category-diversified POI collection 113. The process 127 can be performed by a software module.

Here, the candidate POIs in the category-diversified POI collection 113, re-ranked by the scaled and non-scaled POI scores from the highest to the lowest, are [141 (Restaurant), 145 (Museum), 147 (Shop), 142 (Restaurant), 143 (Restaurant), 146 (Museum), 144 (Restaurant)]. The re-ranked category-diversified POI collection 113 provides an enforcement of category diversity because through candidate POI promotions and demotions, the top candidate POIs in each category is here placed near the top of the search results.

During state (F), the category-diversified POI collection 113 is forwarded in a message 128 to the gateway 104 from the category diversification engine 106. In one implementation, the category-diversified POI collection 113 can be forwarded in its entirety to the gateway 104. In another implementation, the category diversification engine 106 can provide the gateway 104 with a location pointer of which the category-diversified POI collection 113 is stored and can be retrieved.

During state (G), the gateway constructs a message 130 including the category-diversified POI collection 113, where the message 130 can be interpreted by the client device 101. The gateway 104 sends the message 130 to the client device 101 through the network 102.

During state (H), the information related to the category-diversified POI collection 113 is received and analyzed by the client device 101, and displayed to the user via the display 131. The top three results 141, 145, and 147 belong to categories "Restaurant," "Museum," and "Shop," respectively, and provide the user more category diversities in candidate POI choices. The displayed results can be further filtered by the user by category if required. In this present example, the user can choose to display POIs in the category "Restaurant" only, and the displayed list would be ranked from high to low by scaled scores as POIs 141, 142, 143, and 144. This rank is the same as when the candidate POIs in the "Restaurant" category are ranked in the POI collection 111. Therefore the integrity of the candidate POI rank within a category is preserved even after scaling.

Figure 2:
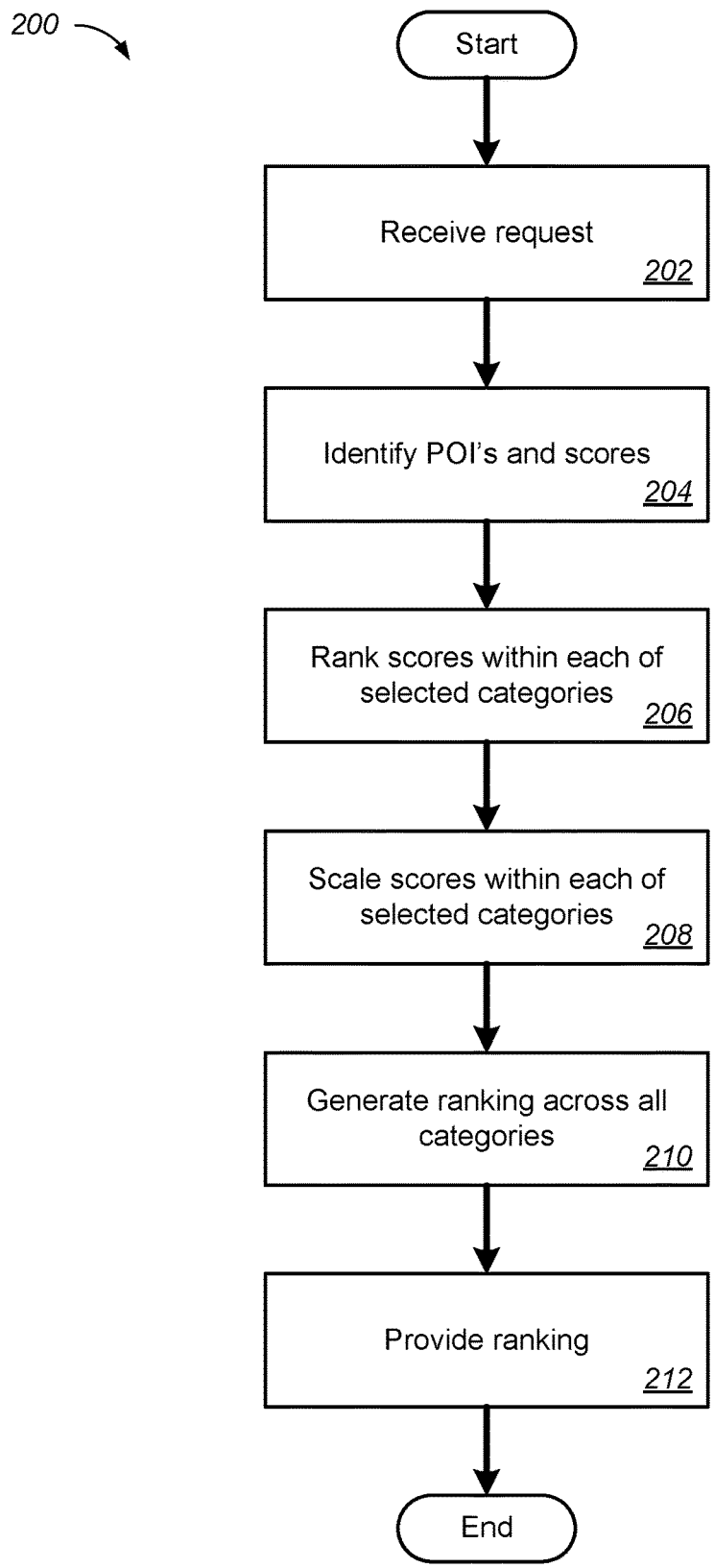
FIG. 2 is a flow diagram illustrating an example process for providing diversified POIs based on category scaling and ranking.

FIG. 2 is a flow diagram 200 illustrating an example process for providing diversified POIs based on category scaling and ranking. In general, the process 200 enforces category diversification for a user-defined search, including a local or point-of-interest (POI) search. The process 200 will be described as being performed by a computer system comprising one or more computers, for example, the category diversification engine 106 as shown in FIG. 1. In this specific example process, the process 200 describes enforcing POI category diversification for a POI-related search on a client device; however, the process 200 can be, in general, applied to enforcing search result type diversification for a user-specified search on a computer system.

The system receives a request to identify POIs (202). In general, the request is issued by a client device operated by a user. In some implementations, the request contains specific location information of the client device, or the request may contain a location of which the user is interested in exploring. In some implementations, the request may include other user information, e.g. user preferences, time of request, etc.

The system obtains data identifying the POIs that satisfy the request, and the data includes a respective category associated with each POI, and a score associated with each POI (204). In one implementation, the data can be provided by a POI ID engine. The POI ID engine maintains or has access to a database containing candidate POIs and information related to the candidate POIs. Based on the POI request (202), the POI ID engine analyzes the request and generates a POI collection from the database. The POI ID engine can determine the number of candidate POIs to be included in the POI collection based on predetermined thresholds. In one implementation, the POI ID engine can use a minimum POI score as a threshold. In another implementation, the POI ID engine can use a maximum distance between a candidate POI and the user as a threshold.

In another implementation, the POI ID engine may use criteria associated with category diversity as thresholds. For example, the POI ID engine may choose to include at least one candidate POI from each selected category. In some implementations, the number of candidate POIs to be included in the POI collection by the POI ID engine may be more than the number of candidate POIs requested by the user or the number of candidate POIs allowed to be displayed on the client device.

The POI collection is, for example, a list or other data structure that specifies name and location information of the candidate POIs, as well as the category and score associated with each candidate POI. The scores associated with the candidate POIs can be determined by various criteria. For example, the criteria can be the number of reviews from other users, the quality of the reviews (e.g. one to five stars), the distance between a candidate POI to the user, the time of the request, etc. Each criterion can have a different weight, and the weighted scores are combined to construct a POI score for each candidate POI in the POI collection. In some implementations, the weights of the scores can be determined by the user's preferences, which are included in the POI request.

The system ranks, for each of the selected categories, the candidate POIs associated with the category, based on the respective scores (206). In one implementation, upon receiving the POI collection, the system sorts the candidate POIs in the POI collection into their respective categories. Then the system selects which categories need to be ranked. For example, the system may only rank a category if there are more than one candidate POIs in that category.

In some implementations, the system may perform the ranking (206) on the server side. For example, a gateway may send the POI collection to a category diversification engine on the server side for ranking the candidate POIs within each of the selected categories. As another example, the POI ID engine may rank the POIs within each of the selected categories prior to forwarding the candidate POI collection to the system.

In some implementations, the system may perform the ranking (206) on the client side. For example, a gateway may send the POI collection to a client device, and a scaling engine inside the client device may perform the ranking of the candidate POIs within each of the selected categories.

In some implementations, there may be a category hierarchy associated with the system, where multiple levels of categories exist. For example, for candidate POIs in a "Restaurant" parent-category, the system may further sort these candidate POIs into sub-categories "Restaurant: Italian", "Restaurant: Chinese", and "Restaurant: American." In one implementation, the system may select and separately rank candidate POIs in one or more sub-categories (i.e. "Restaurant: Italian") associated with one parent-category (i.e. "Restaurant"). In another implementation, the system may select the parent-category and rank all candidate POIs in that parent category (i.e. "Restaurant") regardless of the sub-categories (i.e. "Restaurant: Italian") to which the candidate POIs belonged.

The system scales, for each of the selected categories, the scores of the ranked, candidate POIs associated with the category (208). In general, the system promotes or demotes the POI scores of the candidate POIs through scaling of the POI scores across all selected categories. For each candidate POI in the selected categories, the system scales the POI score associated with the particular candidate POI. In some implementation, the scaling can be performed through a scaling factor in a POI rank scaling table. The POI rank scaling table is, for example, a list or other data structure that specifies scaling factors across each and all selected categories. For each selected category, the scaling factors vary with the POI ranks. In some implementations, a candidate POI with a higher rank can be promoted, which means the POI score associated with the higher-ranked candidate POI will become higher after scaling. A candidate POI with a lower rank can be demoted, which means the POI score associated with the lower-ranked candidate POI will become lower after scaling. The magnitude, or strength, of the scaling can vary with ranks, meaning as ranks go lower, the corresponding candidate POIs can be demoted more significantly. The scaling factors for a given rank can vary across different categories to reflect the relative importance of ranks within each respective category. In some implementations, a candidate POI with a higher rank can be neither promoted nor demoted, which means the POI score associated with the higher-ranked candidate POI will remain the same after scaling. A candidate POI with a lower rank can be neither promoted nor demoted, which means the POI score associated with the lower-ranked candidate POI will remain the same after scaling. When a candidate POI is neither promoted nor demoted, a scaling of the candidate POI is not required.

In some implementations, for a singleton candidate POI, which is the only candidate POI present in a category, no scaling is required for the singleton candidate POI. The non-scaled POI score for the singleton candidate POI can be used to compare with the scaled POI scores in the selected categories. In another implementation, scaling can be applied to a singleton candidate POI, as defined in a POI rank scaling table. The scaled POI score for the singleton candidate POI can be used to compare with the scaled POI scores in the selected categories. In some implementations, the scaling factors for a given rank can vary across different categories to reflect the relative importance of ranks within each respective category.

The system ranks the candidate POIs across all categories, using the scaled POI scores in the selected categories and the non-scaled POI scores in the other categories (210). In some implementations, the system stores the ranked candidate POIs in a category-diversified POI collection.

In some implementations, the system may perform the ranking (210) on the server side. For example, a category diversification engine may rank the candidate POIs by the scaled scores in the selected categories and the non-scaled scores in the other categories, and store the ranked candidate POIs into a category-diversified POI collection.

In some implementations, the system may perform the ranking (210) on the client side. For example, a ranking engine inside the client device may rank the candidate POIs by the scaled scores in the selected categories and the non-scaled scores in the other categories, and store the ranked candidate POIs into a category-diversified POI collection.

The system provides data that identifies two or more of the ranked, candidate POIs (212). The number of ranked candidate POIs identified by the system can be determined by a server, e.g. a gateway, or by a client device. In one implementation, the ranked candidate POIs are stored in a category-diversified POI collection on the server side, and system returns the category-diversified POI collection to the client device. In another implementation, the ranked candidate POIs are provided by a ranking engine within the client device. The ranked candidate POIs provided by the system can be displayed on the client device, or can be further processed by the client device.

Figure 3:
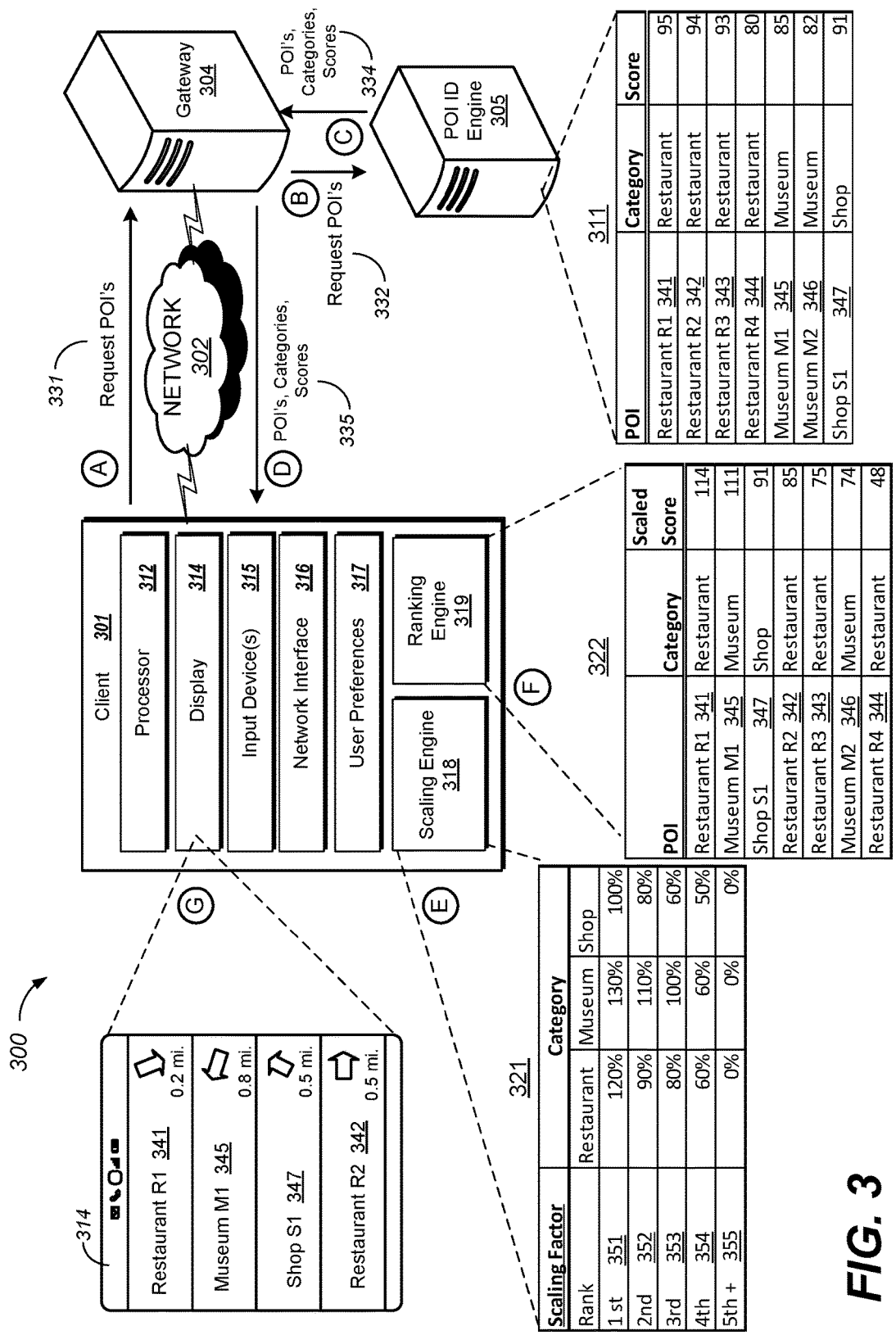
FIG. 3 is a block diagram of an example system that diversifies POIs using category scaling, at the client-side.

FIG. 3 is a block diagram of an example system 300 that diversifies POIs using category scaling, at the client side. Briefly, when a user requests to receive POI information in a particular location, the system 300 generates a collection of POIs and receives information relating to each candidate POI's respective category and the score and rank within the respective category. The system 300 then returns the POI collection to the client, and, for categories selected for scaling, promotes or demotes the score of each ranked candidate POI within its respective category through a scaling mechanism. The system 300 then re-ranks the scaled and non-scaled POIs into one category-diversified POI collection over all categories, and displays the category-diversified POI collection on the client device. In general, the system 300 includes a client device 301, a network 302, a gateway 304, and a POI identification (ID) engine 305.

The client device 301 may be a mobile phone, a laptop computer, a PDA (Personal Digital Assistant), a smart phone, a music player, a tablet computer, an e-book reader, or another portable or mobile device operated by a user. The client device 301 includes one or more processors 312, a display 314, one or more input devices 315, a network interface 316, a user preference module 317, a scaling engine module 318, and a ranking engine module 319. In another implementation, the client device 301 is not portable or mobile, but rather is a desktop computer or a server. In a further implementation, some of these structural elements are omitted or combined.

The client device 301 may be connected to the network 302 and possibly to one or more other networks over the network interface 316. The network 302 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/ or any other delivery or tunneling mechanism for carrying data services. Networks may include multiple networks or subnetworks, each of which may include, for example, a wired or wireless data pathway.

In general, the gateway 304 coordinates the requests and responses between the client device 301, and the POI ID engine 305. For example, when a user operating the client device 301 requests to receive POI information relating to a particular location, the request can be routed to the gateway 304 through the network 302. The gateway 304 forwards the request to the POI ID engine 305. Then, upon receiving a response containing a POI collection from the POI ID engine 305, the gateway 304 returns the POI collection to the client device 301.

In more detail, the POI ID engine 305 receives a request from the gateway 304 as an input. In some implementations, the request can contain user-specific information, e.g. user location, user-defined preferences, and time of the request. The POI ID engine 305 maintains or has access to a database containing POIs and information related to POIs. Based on the request from the gateway 304, the POI ID engine 305 analyzes the request and generates a POI collection 311 from the database. The POI collection 311 is, for example, a list or other data structure that specifies name and location information of the candidate POIs, as well as the category and score associated with each candidate POI. The scores associated with the candidate POIs can be determined by various criteria. For example, the criteria can be the number of reviews from other users, the quality of the reviews (e.g. one to five stars), the distance between a candidate POI to the user, the time of the request, etc. Each criterion can have a different weight, and the weighted scores are combined to construct a POI score for each candidate POI in the POI collection 311. In some implementations, the weights of the scores can be determined by the user's preferences, which are included in the POI request.

In some implementations, the POI ID engine 305 can sort the candidate POIs in the POI collection 311 based on the categories and the POI scores within each respective category. The POI ID engine can also determine the number of candidate POI entries to be included in the POI collection 311 based on predetermined thresholds. In one implementation, the POI ID engine 305 can use a minimum POI score as a threshold. In another implementation, the POI ID engine 305 can use a maximum distance between a candidate POI and the user as a threshold. The output from the POI ID engine 305 can be the POI collection 311, which is forwarded to another engine, e.g. the gateway 304.

In more detail, the scaling engine 318 in the client device 301 receives the POI collection 311 as an input. The collection 311 can be received from the gateway 304 by the network interface 316 and then be transferred to the scaling engine 318. The scaling engine 318 sorts the candidate POIs into their respective categories, and ranks the candidate POIs within each of selected categories based on the POI scores in the POI collection 311.

In some implementations, if there is only one candidate POI in a category, the scaling engine 318 would not select the category and would not scale the one candidate POI. The scale engine 318 promotes or demotes the POI scores in the POI collection 311 through scaling of the POI scores across all selected categories. For each candidate POI entry in the selected categories, the scaling engine 318 scales that particular POI score through a scaling factor in a POI rank scaling table 321. The POI rank scaling table 321 is, for example, a list or other data structure that specifies scaling factors across some or all selected categories. The scaling factors can be derived manually or automatically. For each selected category, the scaling factors vary with the POI ranks.

In some implementations, a candidate POI with a higher rank can be promoted, which means the POI score associated with the higher-ranked candidate POI will become higher after scaling. A candidate POI with a lower rank can be demoted, which means the POI score associated with the lower-ranked candidate POI will become lower after scaling. The magnitude, or strength, of the scaling can vary with ranks, meaning as ranks go lower, the corresponding candidate POIs can be demoted more significantly. The scaling factors for a given rank can vary across different categories to reflect the relative importance of ranks within each respective category. In some implementations, a candidate POI with a higher rank can be neither promoted nor demoted, which means the POI score associated with the higher-ranked candidate POI will remain the same after scaling. A candidate POI with a lower rank can be neither promoted nor demoted, which means the POI score associated with the lower-ranked candidate POI will remain the same after scaling. When a candidate POI is neither promoted nor demoted, a scaling of the candidate POI is not required.

The candidate POIs with the scaled scores in the selected categories and the candidate POIs with the non-scaled scores in other non-selected categories are collected ranked by a ranking engine 319 and are collected in a category-diversified POI collection 322. The category-diversified POI collection 322 is, for example, a list or other data structure that specifies scaled and non-scaled scores for all candidate POIs included in the POI collection 311. In the category-diversified POI collection 322, all candidate POIs are ranked by their scores and are not sorted by categories.

The scaled scores can allow a top candidate in an unpopular category to appear higher in ranks in the category-diversified POI collection 322. The category-diversified POI collection 322 can provide the user with more top search results across different categories. In some implementations, the category information associated with each candidate POI can be stored in the category-diversified POI collection 322 so the user can still sort the candidate POIs by categories if required. The output from the ranking engine 319 can be the category-diversified POI collection 322, and can be displayed on the display 314 in the client device 301.

FIG. 3 also illustrates an example flow of data, shown in states (A) to (G). States (A) to (G) may occur in the illustrated sequence, or they may occur in a sequence that is different than in the illustrated sequence. During state (A), a user operating a client device 301 makes a request 331 to receive POI information relating to a particular location, and the request 331 is routed to a gateway 304 through a network 302. The specific location can be the current location of the client device 301, or can be a location of which the user is interested in exploring. In some implementations, the request 331 may include other user information, e.g. user preferences, time of request, etc.

During state (B), the gateway 304 determines that the request 331 is related to identifying POIs near a location, and sends a request 332 to a POI ID engine 305 to retrieve candidate POIs. The POI ID engine 305 receives the request 332, and constructs a POI collection 311 based on the request 332. In this present example, the POI collection 311 contains seven candidate POI entries 341 to 347, and the POI collection 311 includes information on candidate POI names, as well as the categories and scores associated with the candidate POIs 341 to 347. The scores can be determined by various criteria, which in one implementation can be weighted scores associated with factors such as the distances between the user and the candidate POIs, the number of reviews by other users provided to the candidate POIs, the quality of the candidate POI reviews, the time of the request, etc.

In this present example, among the seven candidate POIs 341 to 347, four candidate POIs (341 to 344) belong to the category "Restaurant," two candidate POIs (345 and 346) belong to "Museum," and one candidate POI (347) belong to "Shop." Here, the candidate POIs 341 to 347 in the POI collection 311, ranked by the POI scores from the highest to the lowest, are [341 (Restaurant), 342 (Restaurant), 343 (Restaurant), 347 (Shop), 345 (Museum), 346 (Museum), 344 (Restaurant)]. The top three candidate POIs are all associated with the category "Restaurant," which may not be helpful information for a user who is not looking for a place to eat. The over-representation of the POIs in the category "Restaurant" may also limit the number of POI categories the user can view on the client device 301, as the display on a portable or mobile device may only be large enough to show a few POIs to the user at a time.

In general, one instance of over-representation can occur when candidate POIs in a category (i.e. "Restaurant") have higher POI scores than candidate POIs in other categories, due to the fact that more reviewers have reviewed POIs associated with the category (i.e. "Restaurant") than have reviewed POIs associated with other categories (i.e. "Museum"). Another instance where an over-representation of candidate POIs in a particular category may occur is in a user-specified location (i.e. a hospital building) where many candidate POIs in the same category are densely-clustered (i.e. doctors' offices inside the hospital complex); the user can easily overlook a candidate POI in a different category (i.e. a gift shop inside the same hospital complex) if it is not placed near the top of the rank.

During state (C), the POI collection 311 is forwarded in a message 334 from the POI ID engine 305 to the gateway 304. In one implementation, the POI collection 311 can be forwarded in its entirety to the gateway 304. In another implementation, the POI ID engine 305 can provide the gateway 304 with a location pointer of which the POI collection 311 is stored and can be retrieved.

During state (D), the gateway constructs a message 335 including the POI collection 311, where the message 335 can be interpreted by the client device 301. The gateway 304 sends the message 335 to the network interface 316 of the client device 301 through the network 302.

During state (E), upon receiving the POI collection 311 from the network interface 316, the scaling engine 318 sorts the candidate POIs in the POI collection 311 into their respective categories. Then the scaling engine 318 determines and selects which categories should be ranked and scaled. For example, for a singleton candidate POI, which is the only candidate POI present in a category, no ranking and scaling steps may be required for the singleton candidate POI, since a category with one POI is not considered an over-represented category. For the selected, over-represented categories, the scaling engine 318 ranks the POIs within each selected category by their POI scores. The ranked POI scores are then promoted or demoted by applying the POI rank scaling table 321 to the selected categories.

The POI rank scaling table 321 contains scaling factors associated with all ranks and categories in the POI collection 311. In general, a scaling factor is a numerical function which takes a POI score as the input, and transforms the POI score into a new score through a pre-determined mechanism. In this present example, the scaling factor is a percentage multiplier, where a POI score is multiplied by a scaling factor associated with the candidate POIs category and the candidate POIs rank within that category.

The scaling factors can be pre-determined automatically by the scaling engine 318. Here, the scaling factors vary depending on the rank and the category of the POIs. For example, a table entry 351 in the POI rank scaling table 321 indicates that for the top-ranked POIs in each category, the POI scores associated with the categories "Restaurant" and "Museum" will be promoted by scaling factors "120%" and "130%", respectively; however, the POI score associated with the category "Shop" will be neither promoted or demoted, as the corresponding scaling factor here is "100%." Within each category, POIs can be further demoted at lower ranks. The increasing demotions of lower-ranked POIs within a category allow promoted top-ranked POIs in other categories to emerge in the displayed search results.

In some implementations, the scaling factors can be determined dynamically upon the scaling engine 318 receiving the POI collection 311. For example, the scaling factors can be determined based on the distribution of various categories among all candidate POIs in the POI collection 311. In the case of over-representation of candidate POIs in a category, the scaling engine 318 may generate or adjust scaling factors to demote lower-ranked candidate POIs in the over-represented category more significantly than lower-ranked candidate POIs in other categories In some implementations, for a singleton candidate POI where a scaling factor is "100%", no ranking and scaling steps are required for the singleton candidate POI. The non-scaled POI score for the singleton candidate POI in the POI collection 311 can be used to compare with the scaled POI scores. In this present example, the candidate POI 347 is a singleton candidate POI, and the non-scaled POI score for the candidate POI 347 can be used to compare with the scaled POI scores without going through ranking and scaling by the scaling engine 318.

During state (F), the ranking engine 319 re-ranks the candidate POIs by the scaled scores in the selected categories and the non-scaled scores in the other categories. The re-ranked data is stored into a category-diversified POI collection 322. Here, the candidate POIs in the category-diversified POI collection 322, re-ranked by the scaled and non-scaled POI scores from the highest to the lowest, are [341 (Restaurant), 345 (Museum), 347 (Shop), 342 (Restaurant), 343 (Restaurant), 346 (Museum), 344 (Restaurant)]. The re-ranked category-diversified POI collection 322 provides an enforcement of category diversity because through candidate POI promotions and demotions, the top candidate POIs in each category is here placed near the top of the search results.

During state (G), the information related to the category-diversified POI collection 322 is displayed on the display 314 in the client device 301. The top three results 341, 345, and 347 belong to categories "Restaurant," "Museum," and "Shop," respectively, and provide the user more category diversities in POI choices. The displayed results can be further filtered by the user by category if required. In this present example, the user can choose to display POIs in the category "Restaurant" only, and the displayed list would be ranked from high to low by scaled scores as POIs 341, 342,

343, and 344. This rank is the same as when the POIs in the "Restaurant" category are ranked in the POI collection 311. Therefore the integrity of the POI rank within a category is preserved even after scaling.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a search query from a computing device;
identifying multiple entities responsive to the search query, each of the multiple entities being associated with a respective relevance score, where the multiple entities are associated with multiple different categories;
determining that a top N ranked entities according to relevance scores includes more than a predetermined number of entities associated with a particular category of the multiple different categories, wherein N is a positive integer that is less than or equal to a count of the multiple entities;
in response to determining that a top N ranked entities according to relevance scores includes more than the predetermined number of entities associated with the particular category, scaling the respective relevance score associated with one or more of the multiple entities by increasing the relevance score of a top most ranked entity associated with the particular category according to both a scaling factor that varies for entities within the particular category and the relevance scores relative to the relevance score of another entity associated with the particular category;
after scaling the respective relevance score associated with one or more of the multiple entities by increasing the relevance score of the top most ranked entity associated with the particular category according to both the scaling factor that varies for entities within the particular category and the relevance scores relative to the relevance score of the another entity associated with the particular category, ranking the multiple entities associated with the multiple different categories based on the relevance scores including the respective relevance score that is scaled; and
providing, to the computing device, data that identifies two or more of the multiple entities, as ranked according to the relevance scores, for display on the computing device as search results that are responsive to the search query.

2. The method of claim 1, comprising:
selecting, as the particular category, a category that is associated with more than a predetermined candidate number of entities.

3. The method of claim 2, wherein scaling the respective relevance score associated with one or more of the multiple entities comprises:
for the particular category:
selecting top n ranked entities associated with the particular category based on the relevance scores, wherein n is a positive integer that is less than or equal to a count of entities associated with the particular category; and
increasing the respective relevance score of one or more of the top n ranked entities.

4. The method of claim 2, comprising:
dynamically determining the scaling factor to use to scale one or more of the respective relevance scores associated with one or more of the multiple entities of the particular category based on a particular relevance score associated with a top ranked entity of a different category.

5. The method of claim 2, comprising:
dynamically determining the scaling factor to use to scale one or more of the respective relevance scores associated with one or more of the multiple entities of the particular category based on a quantity of the multiple entities of the particular category identified.

6. The method of claim 2, wherein in response to determining that a top N ranked entities according to relevance scores for the particular category includes more than the predetermined number of entities associated with the particular category, scaling the respective relevance score associated with one or more of the multiple entities comprises:
in response to determining that the top N ranked entities according to relevance scores for the particular category includes more than the predetermined number of entities associated with the particular category, reducing the relevance score of at least one of the entities associated with the particular category responsive to the search query relative to the relevance score of at least one of the entities associated with another particular category and identified responsive to the search query.

7. The method of claim 1, wherein in response to determining that a top N ranked entities according to relevance scores includes more than the predetermined number of entities associated with the particular category, scaling the respective relevance score associated with one or more of the multiple entities by increasing the relevance score of a top most ranked entity associated with the particular category according to the relevance scores relative to the relevance score of another entity associated with the particular category comprises:
in response to determining that the top N ranked entities according to relevance scores includes two or more entities associated with the particular category, increasing the relevance score of the top most ranked entity associated with the particular category according to the relevance scores and decreasing the relevance score of the another entity associated with the particular category.

8. The method of claim 2, comprising:
determining that the top N ranked entities according to relevance scores includes a single entity associated with a second particular category; and
in response to determining that the top N ranked entities according to relevance scores includes a single entity associated with the second particular category, bypassing scaling the respective relevance score associated with the single entity associated with the second particular category.

9. The method of claim 2, wherein the computing device is configured to display at most a predetermined number of search results at a time, wherein increasing the relevance score of a top most ranked entity associated with the particular category according to the relevance scores relative to the relevance score of another entity associated with the particular category increases a likelihood that the top most ranked entity associated with the particular category and a top most ranked entity associated with a different particular category are displayed at a time on the computing device.

10. A computer-readable storage device having stored thereon instructions, which, when executed by a computer, cause the computer to perform operations comprising:
receiving a search query from a computing device;
identifying multiple entities responsive to the search query, each of the multiple entities being associated with a respective relevance score, where the multiple entities are associated with multiple different categories;
determining that a top N ranked entities according to relevance scores includes more than a predetermined number of entities associated with a particular category of the multiple different categories, wherein N is a positive integer that is less than or equal to a count of the multiple entities;
in response to determining that a top N ranked entities according to relevance scores includes more than the predetermined number of entities associated with the particular category, scaling the respective relevance score associated with one or more of the multiple entities by increasing the relevance score of a top most ranked entity associated with the particular category according to both a scaling factor that varies for entities within the particular category and the relevance scores relative to the relevance score of another entity associated with the particular category;
after scaling the respective relevance score associated with one or more of the multiple entities by increasing the relevance score of the top most ranked entity associated with the particular category according to both the scaling factor that varies for entities within the particular category and the relevance scores relative to the relevance score of the another entity associated with the particular category, ranking the multiple entities associated with the multiple different categories based on the relevance scores including the respective relevance score that is scaled; and
providing, to the computing device, data that identifies two or more of the multiple entities, as ranked according to the relevance scores, for display on the computing device as search results that are responsive to the search query.

11. The computer-readable storage device of claim 10, wherein the operations comprise:
selecting, as the particular category, a category that is associated with more than a predetermined candidate number of entities.

12. The computer-readable storage device of claim 10, wherein scaling the respective relevance score associated with one or more of the multiple entities comprises:
for the particular category:
selecting top n ranked entities associated with the particular category based on the relevance scores, wherein n is a positive integer that is less than or equal to a count of entities associated with the particular category; and
increasing the respective relevance score of one or more of the top n ranked entities.

13. The computer-readable storage device of claim 10, wherein the operations comprise:
dynamically determining the scaling factor to use to scale one or more of the respective relevance scores associated with one or more of the multiple entities of the particular category based on a particular relevance score associated with a top ranked entity of a different category.

14. The computer-readable storage device of claim 10, wherein the operations comprise:
dynamically determining the scaling factor to use to scale one or more of the respective relevance scores associated with one or more of the multiple entities of the particular category based on a quantity of the multiple entities of the particular category identified.

15. A system comprising:
one or more computers; and
a computer-readable storage device having stored thereon instructions that, when executed by the one or more computers, cause the one or more computers to perform operations comprising:

receiving a search query from a computing device;

identifying multiple entities responsive to the search query, each of the multiple entities being associated with a respective relevance score, where the multiple entities are associated with multiple different categories;

determining that a top N ranked entities according to relevance scores includes more than a predetermined number of entities associated with a particular category of the multiple different categories, wherein N is a positive integer that is less than or equal to a count of the multiple entities;

in response to determining that a top N ranked entities according to relevance scores includes more than the predetermined number of entities associated with the particular category, scaling the respective relevance score associated with one or more of the multiple entities by increasing the relevance score of a top most ranked entity associated with the particular category according to both a scaling factor that varies for entities within the particular category and the relevance scores relative to the relevance score of another entity associated with the particular category;

after scaling the respective relevance score associated with one or more of the multiple entities by increasing the relevance score of the top most ranked entity associated with the particular category according to both the scaling factor that varies for entities within the particular category and the relevance scores relative to the relevance score of the another entity associated with the particular category, ranking the multiple entities associated with the multiple different categories based on the relevance scores including the respective relevance score that is scaled; and providing, to the computing device, data that identifies two or more of the multiple entities, as ranked according to the relevance scores, for display on the computing device as search results that are responsive to the search query.

16. The system of claim 15, the operations comprising:

selecting, as the particular category, a category that is associated with more than a predetermined candidate number of entities.

17. The system of claim 15, wherein scaling the respective relevance score associated with one or more of the multiple entities comprises:

for the particular category:

selecting top n ranked entities associated with the particular category based on the relevance scores, wherein n is a positive integer that is less than or equal to a count of entities associated with the particular category; and increasing the respective relevance score of one or more of the top n ranked entities.

* * * * *